United States Patent [19]

Johnson et al.

[11] 4,119,116
[45] Oct. 10, 1978

[54] RECEPTACLE FILL APPARATUS

[75] Inventors: Philip P. Johnson; William T. Lampman, both of St. Joseph, Mich.

[73] Assignee: Whirlpool Corporation, Benton Harbor, Mich.

[21] Appl. No.: 683,952

[22] Filed: May 6, 1976

[51] Int. Cl.[2] ............................................. F16K 21/18
[52] U.S. Cl. ..................................... 137/387; 68/207; 134/57 D; 137/389
[58] Field of Search ............. 68/207; 134/56 R, 57 R, 134/57 D, 58 D; 137/389, 390, 391, 400, 405, 406, 412, 414, 448, 387, 451, 624.12; 251/26

[56] References Cited

U.S. PATENT DOCUMENTS

| | | | |
|---|---|---|---|
| 2,061,608 | 11/1936 | Beckwith et al. | 137/400 |
| 2,120,364 | 6/1938 | Johnson | 137/389 |
| 2,477,897 | 8/1949 | Ray | 251/26 |
| 2,869,628 | 1/1959 | Kuykendall | 137/389 |
| 3,078,858 | 2/1963 | Jacobs et al. | 134/57 D |
| 3,095,895 | 7/1963 | Jacobs | 137/389 |
| 3,211,172 | 10/1965 | Parkison | 137/451 |
| 3,331,374 | 7/1967 | Stewart et al. | 137/448 |
| 3,334,651 | 8/1967 | Clearman | 137/387 |
| 3,527,172 | 9/1970 | Krueger et al. | 137/400 |
| 3,646,948 | 3/1972 | Athey | 134/57 D |
| 3,835,880 | 9/1974 | Hoffman et al. | 137/387 |

*Primary Examiner*—Martin P. Schwadron
*Assistant Examiner*—G. L. Walton
*Attorney, Agent, or Firm*—Wegner, Stellman, McCord, Wiles & Wood

[57] ABSTRACT

A receptacle such as a dishwasher tub having an improved control for effecting filling of the tub to a preselected full level and protecting the apparatus against undesirable overfill in the event the normal flow control malfunctions. The flow control includes a control valve having two valve elements for cooperatively preventing such undesirable overfill. One of the valve elements may be controlled by an electrically operated solenoid, and the other valve element may be controlled by mechanical control structure. In the illustrated embodiment, the electrically controlled valve element is controlled by a timer, and the mechanically controlled valve element is controlled by a float.

10 Claims, 7 Drawing Figures

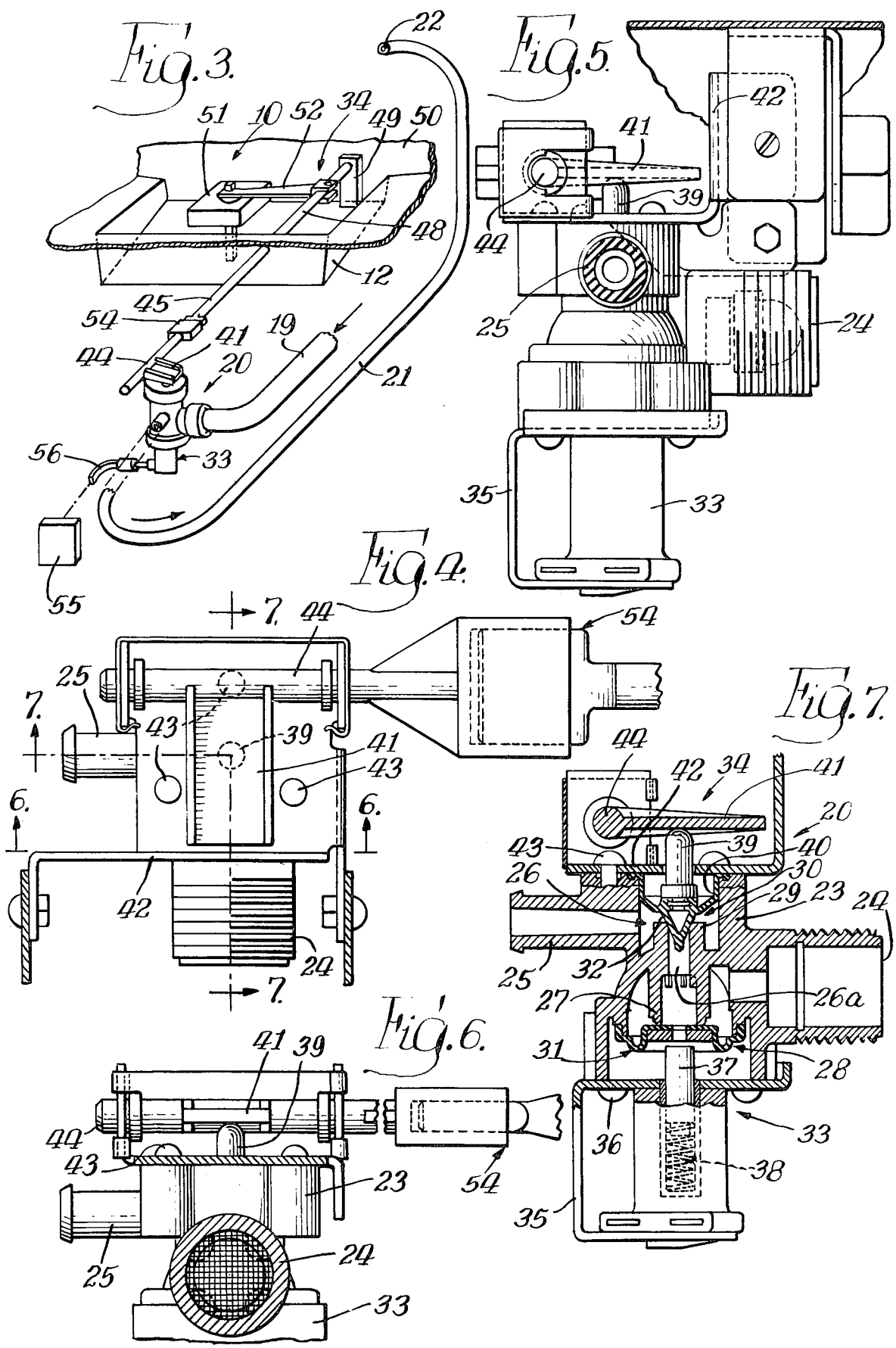

RECEPTACLE FILL APPARATUS

BACKGROUND OF THE INVENTION

1. Field of the Invention

This invention relates to liquid flow control means, and, in particular, to means for controlling the filling of a receptacle, such as a dishwasher tub.

2. Description of the Prior Art

In one conventional dishwasher structure, a tub is provided having a sump portion in which dishwashing liquid is collected for recirculation as by being sprayed against the dishes being washed in the apparatus. The quantity of dishwashing liquid is conventionally controlled by filling the tub to a preselected normal full level from a pressurized liquid source. One example of such an apparatus is shown in United States Letters Pat. No. 3,331,374 of Bruce E. Stewart et al, owned by the assignee hereof. In said patent, the liquid level and flow control includes a drain outlet and a return outlet, with a solenoid operated valve for selectively closing the drain outlet. A float is attached to the valve to open it as the result of a high liquid level condition in the tub, even though the solenoid is de-energized to prevent draining of the liquid from the tub.

A number of different control valves for use in controlling liquid level in different devices are known in the art. Illustratively, a safety cutoff device for fuel supply lines shown in William C. Coleman United States Letters Pat. No. 2,174,055 is used in connection with a delivery of liquid fuel to a gas burning appliance. The Coleman device utilizes a float operated linkage to close the liquid inlet valve under certain operating conditions.

In United States Letters Pat. No. 2,547,098, Carl A. Smith et al disclose an electromagnetic valve having manual means for actuating the valve in event of failure of electrical power.

Thomas B. Chace et al, in United States Letters Pat. No. 2,548,651, show a fluid control system for laundering apparatus, having means for controlling the temperature of the washing liquid, and utilizing float actuated means for controlling a drain valve. A cup-shaped member is provided which operates to cut off liquid delivery, and a weight controlled unit is provided to stop delivery notwithstanding continued operation of the cup-shaped member.

George B. Klaber, in United States Letters Pat. No. 2,937,014, shows a float valve for controlling liquid delivery in a fuel supply line.

John H. Spragins, in United States Letters Pat. No. 2,664,094, shows a level control for controlling the level of dishwasher liquid in a separate well communicating with the tub for providing steam into the washing compartment.

In United States Letters Pat. No. 3,610,271 of Wilbur W. Jarvis, owned by the assignee hereof, a variable liquid level control for use with liquid receiving devices, such as dishwashers and the like, is disclosed as being controlled by a float having a plurality of buoyant compartments, with means for varying the buoyancy of the float by selectively closing the compartments.

SUMMARY OF THE INVENTION

The present invention comprehends an improved means for controlling the filling of a liquid receptacle from a pressurized liquid supply. The present invention is illustrated with respect to a dishwasher, it being understood that the invention is adapted for use with any liquid holder receptacle means.

The invention comprehends providing such an improved fill control means including a control valve defining a liquid flow passage having an upstream portion and downstream portion, means for connecting the upstream portion to a pressurized liquid supply, means for delivering liquid from the downstream portion into the receptacle, the control valve including first valve means for selectively closing the upstream portion for controlling liquid delivery through the flow passage to the receptacle, and second valve means for selectively closing the downstream portion as an incident of the liquid level in the receptacle reaching a preselected full level, and means for causing liquid flow from the liquid supply to the receptacle to be terminated by the first valve means closing the upstream portion of the flow passage in the event of malfunctioning of the second valve means permitting the receptacle to be filled beyond said preselected full level.

The control valve may utilize both electrically operated and mechanically operated valve means as the two valve means thereof. In the illustrated embodiment, the first valve means comprise an electrically operated solenoid valve, and the second valve means comprises a mechanically operated float control valve.

In the illustrated embodiment, the safety cutoff of the fill is effected at the end of a preselected period of time by means of a timer associated with the solenoid valve. Illustratively, the maximum fill in the receptacle may be approximately twice the normal full fill, and thus the timer may be arranged to provide a total time of delivery approximately twice that normally required to provide the preselected normal full condition.

Thus, in the present invention, initiation of the delivery is effected by an electrically operated valve, normal termination of the delivery is effected by a float controlled valve, and safety overfill limit is provided by the electrically operated valve under the control of timer means.

BRIEF DESCRIPTION OF THE DRAWING

Other features and advantages of the invention will be apparent from the following description taken in connection with the accompanying drawing wherein:

FIG. 3 is a perspective view thereof;

FIG. 4 is a side elevation of the valve means thereof;

FIG. 5 is an end elevation thereof;

FIG. 6 is a rear elevation thereof, taken substantially along the line 6—6 of FIG. 4; and FIG. 7 is a vertical section taken substantially along the line 7—7 of FIG. 4.

DESCRIPTION OF THE PREFERRED EMBODIMENT

Figure 1:
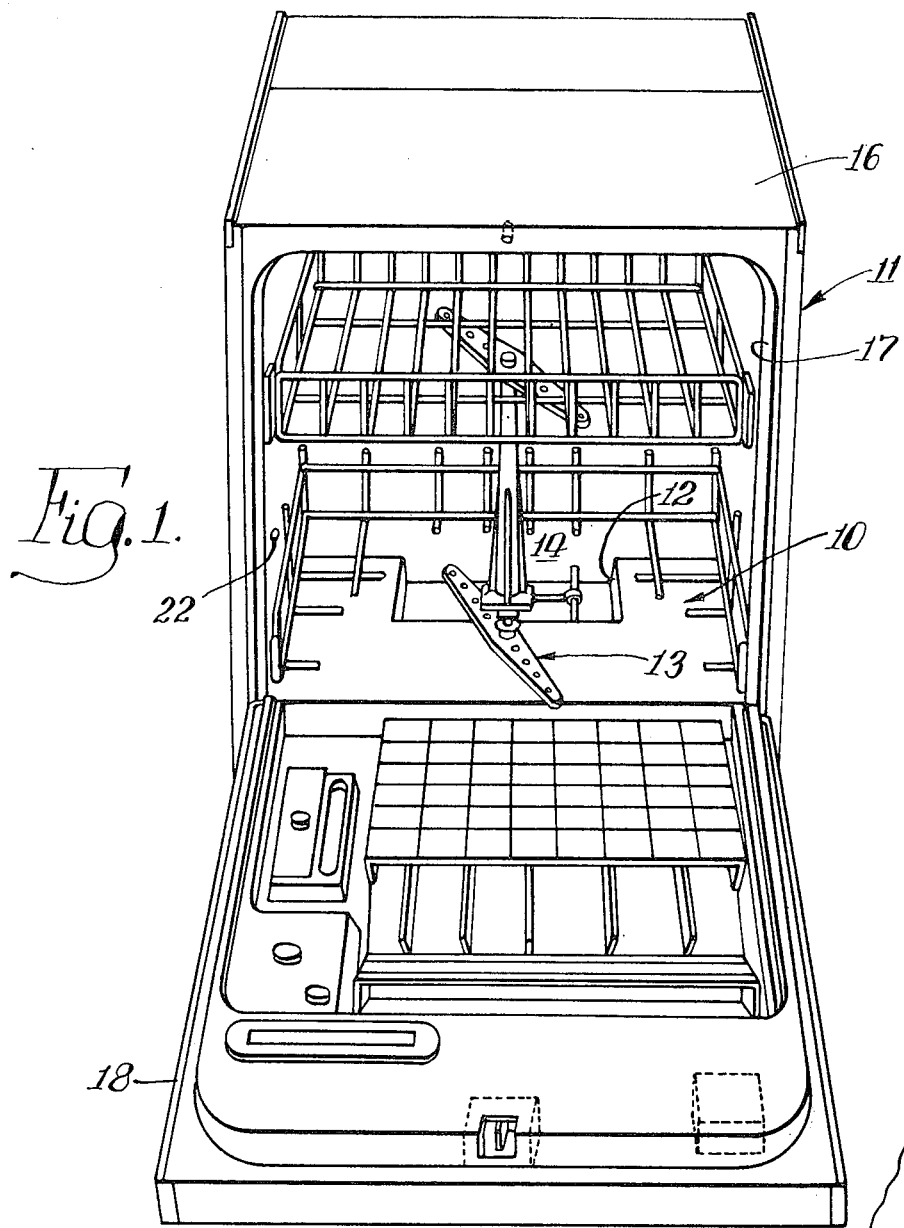
FIG. 1 is a front perspective view of a dishwasher having improved liquid delivery means comprising the invention.

In the exemplary embodiment of the invention as disclosed in the drawing, a liquid receptacle generally designated 10 illustratively comprises the tub of a dishwasher generally designated 11. The tub includes a sump portion 12 (FIG. 3) adapted to collect the dishwashing liquid for recirculation against the dishes by a suitable spray means generally designated 13 rotated in the dishwashing space 14 by the reaction forces of the liquid supplied to the spray arms by a pump (not shown) driven by an electric motor (not shown).

As shown in FIG. 1, the dishwasher includes an outer housing 16 defining a front opening 17 selectively closed by a door 18.

As further shown in FIGS. 1 and 3, dishwashing liquid is introduced into tub 10 from a pressurized liquid line 19 through a control valve 20 and an inlet line 21 opening into the tub through an inlet opening 22 in one side wall of tube 10. The inlet line 21 includes a vacuum break (not shown) of any conventional type for eliminating any possibility of contamination of the pressurized liquid supply from the dishwasher.

As discussed briefly above, the present invention is concerned with the control of filling of the tub, and, more specifically, is concerned with preventing undesirable overfill of the tub in the event of malfunctioning of the liquid control valve means.

The present invention comprehends the provision of two different valve means in the control valve 20 cooperatively preventing such undesirable malfunctioning.

More specifically, as shown in FIG. 7, control valve 20 includes a body 23 defining an inlet connection 24 and an outlet connection 25 at opposite ends of a through passage generally designated 26. The body defines a first valve seat 27 at an upstream portion 28 of flow passage 26, and a second valve seat 29 at a downstream portion 30 of the flow passage.

A first valve means generally designated 31 is provided for controlling, in cooperation with valve seat 27, liquid flow through the upstream portion 28, and a second valve means generally designated 32 is provided for controlling, in cooperation with second valve seat 29, liquid flow through second flow passage portion 30. As seen in FIG. 7, the flow passage between the valve seats 27 and 29, respectively, comprises a rectilinear mid-portion 26a of the flow passage 26.

The invention comprehends the operation of the valve means 31 and 32 by different types of operators, and in the illustrated invention, valve means 31 is operated by an electrical operator 33 and valve means 32 is operated by a mechanical operator 34.

More specifically, valve means 31 may comprise a diaphragm valve and operator 33 may comprise a solenoid operator carried on a suitable bracket 35 secured to valve body 23 by suitable means, such as screws 36.

As shown in FIG. 7, diaphragm valve 31 is arranged to be opened by the fluid pressure acting thereon from the inlet 24, and is closed by a plunger 37 of solenoid 33 which is biased to the closed position by a suitable spring 38.

Valve means 32 comprises a pin diaphragm valve including an actuator pin 39 and a diaphragm 40 selectively seated on valve seat 29. Diaphragm 40 is urged into the seated, valve-closed, position by an arm 41 bearing against pin 39 and journaled in a suitable bracket 42 secured to valve body 23 by suitable means, such as screws 43. Arm 41 is carried on a distal end 44 of a control rod 45 (see FIG. 2) extending through a side wall 46 of tub sump 12 and journaled therein in a sealed bearing 47. Rod 45 includes an end portion 48 within sump 12 journaled at its distal end in an end bearing 49 on opposite wall 50 of the sump.

A float 51 is secured to rod end portion 48 by a bracket 52 and suitable securing means, such as screw 53.

Figure 2:
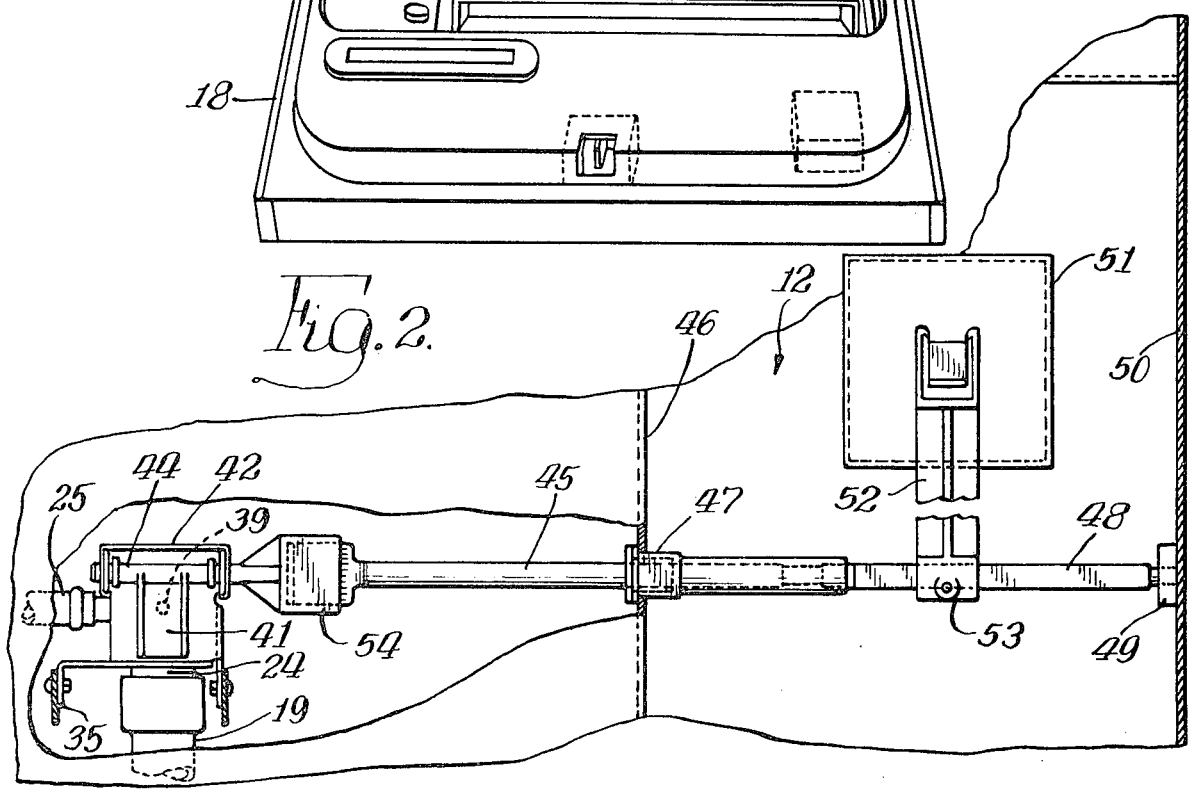
FIG. 2 is a fragmentary, enlarged vertical section showing the improved level control means.

A disconnect coupling 54 may be provided on distal end 44 and on rod 45, as illustrated in FIG. 2.

As shown in FIG. 3, solenoid 33 may be controlled by a suitable timer 55 connected to the solenoid by suitable leads 56.

The use of control valve 20 provides an improved filling of the liquid receptacle in a novel and simple manner. More specifically, the preferred form of the invention comprehends the filling of tub 10 to the desired normal fill or full level by initiation of the filling operation by timer 55. The timer effects a withdrawal of plunger 37 to open valve means 31 and permit fluid pressure acting on diaphragm valve 32 to open the diaphragm valve, permitting the supply liquid to pass outwardly through connector 25 and line 21 to the tub inlet 22.

Timer 55 is set for a delivery time greater than that normally required to fill the tub 10 to the desired full level. The termination of delivery of dishwashing liquid into tub 10 is effected by a closing of valve 32 by the float 51 turning rod 45 suitably to depress pin 39 and urge diaphragm 40 into seated engagement with valve seat 29 when the level of liquid in sump 12 reaches a level representative of a preselected desired full level.

Timer 55 times out after a preselected further period of time, closing diaphragm valve 31 by de-energization of solenoid 33 and thereby positively preventing further delivery of liquid into tub 10. Thus, in the event that the float operated control valve means malfunctions and does not stop further delivery of dishwashing liquid into the tub, the valve means 31 will prevent undesirable overfill beyond a maximum preselected or over full level.

Alternatively, should the solenoid valve 31, 33 malfunction so as to maintain valve 31 open, delivery of liquid into tub 10 is normally prevented beyond the normal full level by valve means 32. Thus, each valve functions synergistically in combination with the other valve to provide a desirable overall safety filling of the receptacle effectively positively preventing flooding of the receptacle.

It should be noted that in most dishwashers the pump begins to operate before normal fill is complete and that the float 51 will therefore sense a level of liquid in the sump that is only representative of the total volume of liquid in the dishwasher tub since a substantial volume of liquid will be present in the dishwasher's liquid distribution system including the spray arms and enroute to contacting the dishes. Therefore, if the pump becomes inoperative prior to a completion of the normal fill the float-operated second valve means 32 will interrupt the fill as all the liquid in the tub flows into the sump area. This assumes, of course, that there is sufficient total liquid in the tub when the pump stops to fill the sump under static conditions to the level representative of a normal fill volume under dynamic conditions. Should the pump thereafter begin operating once again the float will drop with the liquid level in the sump and the fill will continue provided the timer 55 has not already timed out to close valve means 31.

Although the specific structure and detailed operation of the embodiment just described represents a preferred form of the invention herein, it should be understood that the invention also comprehends the embodiment wherein time dependent means such as a timer controlled valve means is designed to terminate the fill at the end of a preselected period representative of a normal fill, and liquid level dependent means such as a float-operated valve means operates to prevent overfilling of said receptacle beyond a preselected maximum over full level.

The liquid filling apparatus of the present invention is extremely simple and economical of construction, while providing the highly desirable features discussed above.

The foregoing disclosure of specific embodiments is illustrative of the broad inventive concepts comprehended by the application.

We claim:

1. In an apparatus having a liquid holder receptacle, improved means for controlling the filling of the liquid receptacle from a pressurized liquid supply, comprising: a control valve defining a liquid flow passage having an upstream portion and downstream portion; means for connecting said upstream portion to a pressurized liquid supply; means for delivering liquid from said downstream portion into the receptacle, said control valve including first movable valve means for selectively closing said upstream portion for controlling liquid delivery to said downstream portion of said flow passage to said receptacle, and second movable valve means operable for selectively closing said downstream portion means for operatively said second valve means at all times independently of said first valve means for closing said downstream of the valve as an incident of the liquid level in said receptacle reaching a preselected full level, the closing of either of said portions by its associated valve means preventing further delivery of liquid to said receptacle notwithstanding a malfunctioning of the other of the valve means; and flow terminating means for causing liquid flow from said liquid supply to said receptacle to be terminated by said first valve means closing said upstream portion of the flow passage at the end of a preselected time period greater than the time period required to permit the liquid delivery means to fill said receptacle to said preselected full level, thereby permitting only up to a maximum preselected level despite a malfunctioning of said second valve means permitting the receptacle to be filled beyond said preselected full level.

2. The receptacle liquid filling apparatus of claim 1 wherein said second valve means comprises a pin diaphragm valve.

3. The receptacle liquid filling apparatus of claim 1 wherein said first valve means comprises a solenoid valve, and said flow terminating means comprises timer controlled switch means.

4. The receptacle liquid filling apparatus of claim 1 wherein said second valve means includes float means responsive to the level of liquid in said receptacle.

5. The receptacle liquid filling apparatus of claim 1 wherein said flow passage defines a mid-portion and said valve means are provided at opposite ends of said mid-portion.

6. The receptacle liquid filling apparatus of claim 1 wherein each of said valve means comprises a diaphragm valve, said flow passage defines a rectilinear mid-portion defining valve seats at the opposite ends thereof and the diaphragms of said diaphragm valves selectively seat on said valve seats.

7. The receptacle liquid filling apparatus of claim 1 wherein each of said valve means comprises a diaphragm valve, said flow passage defines a rectilinear mid-portion defining valve seats at the opposite ends thereof and the diaphragms of said diaphragm valves selectively seat on said valve seats, said first valve means diaphragm being biased into seated engagement with the valve seat to define a normally closed valve.

8. The receptacle liquid filling apparatus of claim 1 wherein each of said valve means comprises a diaphragm valve, said flow passage defines a mid-portion defining valve seats at the opposite ends thereof and the diaphragms of said diaphragm valves selectively seat on said valve seats, said second valve means comprising a normally open valve.

9. The receptacle liquid filling apparatus of claim 1 wherein said means for causing said flow to be terminated further comprises means for initiating said flow.

10. The receptacle liquid filling apparatus of claim 1 wherein said means for causing said flow to be terminated further comprises timer means for initiating said flow.

* * * * *

UNITED STATES PATENT AND TRADEMARK OFFICE
CERTIFICATE OF CORRECTION

PATENT NO. : 4,119,116
DATED : October 10, 1978
INVENTOR(S) : Philip P. Johnson and William T. Lampman It is certified that error appears in the above-identified patent and that said Letters Patent are hereby corrected as shown below:

Column 5, Claim 1, line 25, after "portion" insert a semi-colon (--;--), and after "for" cancel "operatively" and substitute therefor --operating--.

Column 5, Claim 1, line 27, after "downstream", insert --portion--.

Signed and Sealed this

Third Day of April 1979

[SEAL]

Attest:

RUTH C. MASON
Attesting Officer

DONALD W. BANNER
Commissioner of Patents and Trademarks